United States Patent [19]

Behensky et al.

[11] Patent Number: 5,044,956
[45] Date of Patent: Sep. 3, 1991

[54] CONTROL DEVICE SUCH AS A STEERING WHEEL FOR VIDEO VEHICLE SIMULATOR WITH REALISTIC FEEDBACK FORCES

[75] Inventors: Max L. Behensky, Hayward; Rick L. Moncrief, Santa Clara; Erik J. Durfey, Los Gatos; Milton H. Loper, III, Mountain View, all of Calif.

[73] Assignee: Atari Games Corporation, Milpitas, Calif.

[21] Appl. No.: 296,472

[22] Filed: Jan. 12, 1989

[51] Int. Cl.$^5$ ............................................. G09B 9/08
[52] U.S. Cl. ....................................... 434/45; 434/62; 434/65; 434/71
[58] Field of Search ....................... 434/45, 46, 47, 62, 434/65, 71, 258; 273/1 G

[56] References Cited

U.S. PATENT DOCUMENTS

| | | | |
|---|---|---|---|
| 3,220,121 | 11/1960 | Cutler | 434/45 |
| 3,517,446 | 4/1967 | Corlyon et al. | 434/45 |
| 4,251,931 | 2/1981 | McKechnie | 434/62 |
| 4,398,889 | 8/1983 | Lam et al. | 434/45 |
| 4,599,070 | 7/1986 | Hladkey et al. | 434/45 |
| 4,708,656 | 11/1987 | de Vries et al. | 434/45 |

FOREIGN PATENT DOCUMENTS 2159111  5/1984  United Kingdom ................. 434/45

Primary Examiner—Edward M. Coven
Assistant Examiner—Dean Small
Attorney, Agent, or Firm—Skjerven, Morrill, MacPherson, Franklin & Friel

[57] ABSTRACT

An apparatus and method for simulating the forces acting on the steering wheel or other control device of a vehicle. The apparatus uses an electrical motor coupled to a steering wheel in the preferred embodiment. The electrical motor is driven by a computer running software which received data regarding the real world forces which would be acting upon a real steering wheel in a car under similar conditions. A software driver coupled to a position-sensing transducer on the steering wheel calculates the steering wheel position and velocity and sends this data to a model process not forming part of the invention. The model process then calculates the conditions affecting the simulated vehicle and outputs data reflecting the real world forces which would affect the steering wheel of the actual car under similar conditions. This data is used to calculate a force number which in turn drives a driver amplifier and motor combination coupled to the steering wheel of the simulated vehicle to simulate the forces that the driver of a real vehicle would feel.

14 Claims, 13 Drawing Sheets

```
wheelpos()
{
10      short pos,diff;
11      static short oldrawpos;

12      pos = AD12VAL[WHEELPOT]-wheelcenter;

13      pos = (pos * wheelscale)>>12;

14      rawswvel = ((rawswvel + ((pos - oldrawpos)<<3)))>>1;
15      oldrawpos = pos;

16      if(!play)
17              return(pos);

18      diff = pos - playpos;

19      if(diff > play){
20              playpos = pos - play;
        }
21      else{
22              if(diff < -play){
23                      playpos = pos + play;
                }
24              else{
25                      if(rawswforce > playforce)
26                              playpos++;
27                      if(rawswforce < -playforce)
28                              playpos--;
                }
        }

29      swvel += (short)((((pos-oldpos)<<VELSHIFT)-swvel)/velfres);
30      oldpos=pos;

31              if(railroadcabinet)
32                      return((short)((playpos*2)/(short)3));
33              else
34                      return(playpos);
        }
```

FIG. 10A

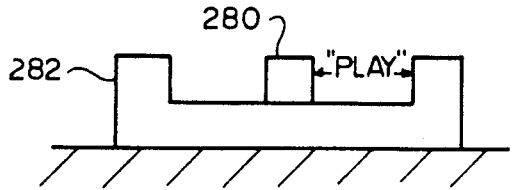

FIG. 11

```
45      short swfdel=10;
46      setswforce(force)
47      register short force;
        {
48              register unsigned char opval;
49              register short time;

50              if(force > SWFMAX) force = SWFMAX;
51              if(force < -SWFMAX) force = -SWFMAX;

52              if((swfscale <= 0x2000) && (swfscale >= 0)){
53              force = (force * swfscale)>>14;
                }
54              else{
55                      force = 0;
                }
56              rawswforce = force;

57              if(force < 0){
58                      force = -force;
59                      opval = force & 0x1f;
60                      opval &= LSCLK;
61                      forceloc = opval;

62                      opval := MSCLK;
63                      for(time=swfdel;time-- != 0;);
64                      forceloc = opval;

65                      opval = force >> 5;
66                      opval := CCW;
67                      opval := MSCLK;
68                      for(time=swfdel;time-- != 0;);
69                      forceloc = opval;

70                      opval &= LSCLK;
71                      for(time=swfdel;time-- != 0;);

72                      forceloc = opval;
                }
73              else{

74                      opval = force & 0x1f;
75                      opval &= LSCLK;
76                      forceloc = opval;

77                      opval := MSCLK;
78                      for(time=swfdel;time-- != 0;);
79                      forceloc = opval;

80                      opval = force >> 5;
81                      opval &= CW;
82                      opval := MSCLK;
83                      for(time=swfdel;time-- != 0;);
84                      forceloc = opval;

85                      opval &= LSCLK;
86                      for(time=swfdel;time-- != 0;);
87                      forceloc = opval;
                }
        }
```

FIG. 10B

```
doforcewheel()
{
10   register short torque,temp;
11   short servotor,adjswpos;
12   short otherforce,dampforce;

13   adjswpos = swpos + (short)(rawswvel/(short)16);

14   if(intcount++>25)swtorque=0;/* Zero torque if MSP crashed */

15   filtswtorque += (swtorque - filtswtorque)>>swtorquefres;

16   torque = filtswtorque >> 3;

17   /* Clip torque from model */
18   if(torque > SWFMAX) torque = SWFMAX;
19   if(torque < -SWFMAX) torque = -SWFMAX;

20   /* Add friction */
21   swfrtor = (short)(((short)(adjswpos - swfrblk)*swfrk)/0x10);

22   if(swfrtor > swfrict){
23       swfrtor = swfrict;
24       swfrblk = adjswpos -(short)((swfrtor<<4)/(short)swfrk);
     }

25   if(swfrtor < -swfrict){
26       swfrtor = -swfrict;
27       swfrblk = adjswpos -(short)((swfrtor<<4)/(short)swfrk);
     }

28   /* Add servo torque, if present */
29   if(servok){
30       servotor=(short)(((short)(adjswpos-servopos)*servok)/0x10);

31       if(servotor > MAXSERVOTOR) servotor = MAXSERVOTOR;
32       if(servotor < -MAXSERVOTOR) servotor = -MAXSERVOTOR;
     }
33   else
34       servotor = 0;
```

FIG. 12A

FIG. 13

```
35      /* This is used to test the steering wheel safety functions */
36      if(testbug){
37              torque = testbug;
38              swfrtor = 0;
39              swdampk = 0;
40              servotor = 0;
        }
41      /* Every 8 timer interrupts (32 ms) check change in 8 bit
42      steering wheel pot value to see if it says the wheel is turning
43      too fast */

44      if(!(safecnt++ & 0x7)){
45              forceoff = 0;
46              /* Calc 8 bit speed over last 16 iterations */
47              temp = AD8VAL[AUXWHEELPOT] - swp8;       /* Change=vel */
48              swp8 = AD8VAL[AUXWHEELPOT];

49              if(temp < 0) temp = -temp;

50              if(temp > maxspd8){
51                      forceoff = 1;
                }

52              /* Check difference between 8 bit and 12 bit A/D values
53              for steering wheel; zero force if they don't jibe */

54              temp = (AD8VAL[AUXWHEELPOT] -(AD12VAL[WHEELPOT]>>4));
55              if((temp > MAX812DIFF) :: (temp < - MAX812DIFF)){
56                      forceoff = 1;
                }
        }
57      /* Check for safety conditions and zero wheel if it
58      is going too fast or A/D values invalid */

59      if((swvel > velmax) :: (swvel < -velmax) :: forceoff){
60              if(swvel >= 0)
61                      setswforce(-1);  /* Low force, other direction
                                            to create eddy current drag */
62              else
63                      setswforce(0);
        }
64      else{
65              /* Set steering wheel force based on model, friction,
66              servo torque, and damping */
67              setswforce(torque + swfrtor + servotor -
68                      ((swvel * swdampk)>>(VELSHIFT-1)));
        }
```

FIG. 12B

```
setswforce(force)
register short force;
{
        register unsigned char opval;
        register short time;

if(force > SWFMAX) force = SWFMAX;
        if(force < -SWFMAX) force = -SWFMAX;

if((swfscale <= 0x2000) && (swfscale >= 0)){
                force = (force * swfscale)>>14;
        }
        else{
                force = 0;
        } rawswforce = force;

if(force < 0){
                force = -force;

opval = force & 0x1f;
                opval &= LSCLK;
                forceloc = opval;

opval := MSCLK;
                for(time=swfdel;time-- != 0;);
                forceloc = opval;

opval = force >> 5;
                opval := CCW;
                opval := MSCLK;
                for(time=swfdel;time-- != 0;);
                forceloc = opval;

opval &= LSCLK;
                for(time=swfdel;time-- != 0;);

forceloc = opval;
        }
        else{
                opval = force & 0x1f;
                opval &= LSCLK;
                forceloc = opval;

opval := MSCLK;
                for(time=swfdel;time-- != 0;);
                forceloc = opval;

opval = force >> 5;
                opval &= CW;
                opval := MSCLK;
                for(time=swfdel;time-- != 0;);
                forceloc = opval;

opval &= LSCLK;
                for(time=swfdel;time-- != 0;);
                forceloc = opval;
        }
}
```

FIG. 14

```
/* This routine sets up the steering wheel to reasonable initial
values */ def_wheelvalues()
{
        wheelcenter = 0x800;
        wheelscale = 4096 * 3 / 5;
}
/* This routine sets up the zeropower limits for the steering wheel
*/ wheelinit()
{
        char line[50];
        unsigned time;
        short val;
        unsigned short min,max;
        petdog();
        NoGSPCls();
        petdog();

while(KEYSTART)
              petdog();

NoGSPString(0x10,0x10,255,"INITIALIZE STEERING LIMITS:");
        NoGSPString(0x10,0x20,255,"TAKE HANDS OFF STEERING WHEEL");
        NoGSPString(0x10,0x30,225,"THEN TURN KEY");

sprintf(line,"OLD MIN %3d MAX %3d",
              zplim12array[WHEELPOT]. min,zplim12array[WHEELPOT].max);

NoGSPString(0x10,0x50,255,line);

def_wheelvalues();

freewheel();

while(!KEYSTART)
              petdog();

time = IRQTIME;

do{
              val = -(unsigned short)(
                  (unsigned)((unsigned short)(IRQTIME - time) * 2048)/
                  (unsigned short)(4*TICSPERSEC));
              servowheel(val);
              petdog();
        )
        while(val > -2048);

time = IRQTIME;
        while((IRQTIME - time) < (TICSPERSEC))
              petdog();

min = AD12VAL[WHEELPOT];
```

FIG. 15A

```
sprintf(line,"NEW MIN %3d",min);
NoGSPString(0x10,0xA0,255,line);

time = IRQTIME;
do{
        val = -2048 + (unsigned short)(
                (unsigned)((unsigned short)(IRQTIME - time)* 4096)/
                (unsigned short)(8*TICSPERSEC));
        servowheel(val);
        petdog();
}
while(val < 2048);

time = IRQTIME;
while((IRQTIME - time) < (TICSPERSEC))
        petdog();

max = AD12VAL[WHEELPOT];
sprintf(line,"MAX %3d",max);
NoGSPString(0xD0,0xA0,225,line);

lim12array[WHEELPOT].min=min;
lim12array[WHEELPOT].max=max;

WriteZeropower(&lim12array[WHEELPOT],&zplim12array[WHEELPOT],
        sizeof(lim12array[WHEELPOT]));

time = IRQTIME;
while((IRQTIME - time) < (TICSPERSEC*2))
        petdog();
}
```

FIG. 15B

```
do_seat()
{
        extern short swfscale;
        short temp;

temp = AD8VAL[SEATPOT];

if(slockflag && (temp < sulpos))

SEATLOCK();
        else
                SEATUNLOCK();

if(temp < srfpos){
                temp = srfpos - temp;
                temp = (short)((temp * SRFAMOUNT)/(short)SRFRANGE);

if(temp > SRFAMOUNT)
                        temp = 0x4000 - SRFAMOUNT;
                else
                        temp = 0x4000 - temp;

swfscale = ((short)opswfscale() * temp)>>14;
```

FIG. 16

CONTROL DEVICE SUCH AS A STEERING WHEEL FOR VIDEO VEHICLE SIMULATOR WITH REALISTIC FEEDBACK FORCES

BACKGROUND OF THE INVENTION

The invention pertains to the field of vehicle simulators, and, more particularly, to the field of vehicle simulators having realistic force feedback to the control devices manipulated by the driver/pilot to simulate the actual forces which would be felt in a real vehicle under similar circumstances.

Vehicle simulators have been used extensively by the armed services and NASA for pilot training and some simulators have been used for driver training. Some of these simulators have realistic feedback forces for the control devices manipulated by the trainee, but as far as the applicants are aware, no simulator has used electrical motors to simulate forces that the trainee would feel through the simulated vehicle's controls.

In the video game industry, some video games have used electric motors to shake the control devices for a simulated vehicle, but as far as the applicants are aware, no video game has simulated the actual forces a driver would feel through, for example, the steering wheel of a car. Since the hydraulic apparatus of expensive military simulators is both too expensive and too complicated and unreliable for video games, there has arisen a need for an apparatus and method of realistically simulating in a video game or simulator environment actual forces the operator of a vehicle would feel in operating an actual vehicle. This apparatus and method must be simple, reliable, all electric and inexpensive.

SUMMARY OF INVENTION

According to the teachings of the invention, there is disclosed herein an apparatus for electrically simulating the real world forces which would be felt by the operator of a vehicle in manipulating the control devices of an actual vehicle under the simulated conditions. Although the teachings of the invention are equally applicable to many different control devices for many different vehicles, such as the steering wheel for a car or the control yoke for an airplane, in the preferred embodiment disclosed herein, a steering wheel for a simulated car has been selected to illustrate the teachings of the invention.

In the preferred embodiment, the apparatus according to the teachings of the invention includes one or more computers, an electric motor, a simulated steering wheel and transducers that couple the steering wheel to the computers as well as software routines executed by at least one of the computers to control the motor in accordance with certain data. In some embodiments the functions performed by multiple computers can all be executed by a single computer.

Those functions include reading position transducers to determine the position of the steering wheel, its rotational velocity and the direction of rotation. This information is then used in calculations not forming part of the teachings of the invention to determine how a real vehicle would respond to similar control inputs. These calculations result in the generation of output data which defines the forces which should be felt in the steering wheel. Another computer or another software process in the same computer then accepts this output number. This output number is applied to the input of a motor driver amplifier which has its output coupled to a D.C. motor. The output number is converted to a drive current through the motor by the driver amplifier. This current causes the motor to exert a torque on the steering wheel which simulates several real world forces. Those forces are the force transmitted to the steering wheel from the wheels of the car, and the friction and damping forces which act on the steering wheel steering from the characteristics of the steering mechanisms of a real car. In other embodiments, other real world forces can be simulated.

BRIEF DESCRIPTION OF THE DRAWINGS

FIGS. 10A and 10B are a high level language description in C of the software driver routine which calculates steering wheel position and velocity from data provided by position sensors.

FIG. 11 is a symbolic diagram of a model illustrating the concept of steering wheel play digitally implemented in the code of FIGS. 10A and 10B.

FIGS. 12A and 12B are a high level language description in C language of the software driver routine which receives input data from a model process defining the forces which are supposed to be acting upon the steering wheel given current operating conditions and computes a digital number to be output to the motor driver amplifier to simulate the real world forces.

FIG. 13 is a model for illustrating the friction forces which are digitally implemented by the software of FIGS. 12A and 12B.

FIG. 14 is a high level language description of a routine used to set various limits in controlling the force exerted by the steering wheel motor.

FIGS. 15A and 15B are an initialization routine to set up initial values and calculate the wheelcenter variable for use in controlling the steering wheel drive motor.

FIG. 16 is a routine which scales the force applied to the steering wheel according to the position set by the player for the seat in which the player sits when playing the game for safety purposes.

DETAILED DESCRIPTION OF THE PREFERRED EMBODIMENT

Figure 1:
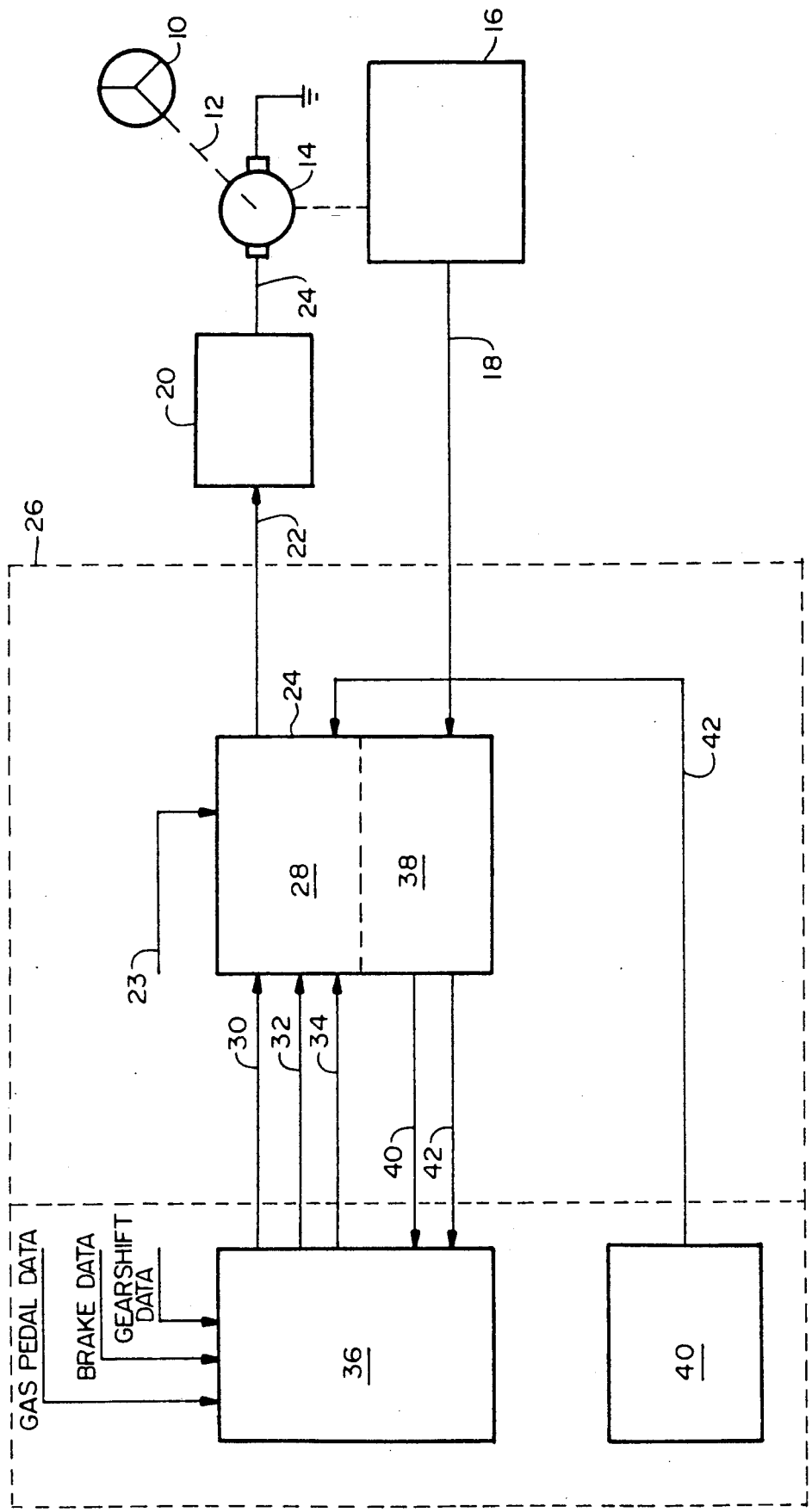
FIG. 1 is a block diagram of the hardware and software which together comprise an apparatus according to the teachings of the invention.

Referring to FIG. 1, there is shown an apparatus according to the teachings of the invention. A simulated steering wheel 10 is mechanically coupled by apparatus shown symbolically at 12 to a motor 14. In the preferred embodiment, the motor 14 is a D.C. brush motor with a torque sensitivity of 1 foot-pound/ampere. The motor has a low D.C. resistance and an inductance of approximately 30 millihenries. Typically, the top speed of the motor is 700 RPM. The motor used in the preferred embodiment is manufactured by Ohio Motor of Barnardsville, N.C. under model number B-561214×8837, but, in alternative embodiments, other motors may also be used.

One or more position sensing transducers 16 are coupled to the motor 14 for providing feedback signals on line 18 regarding the position of the shaft of the motor 14 or steering wheel 10 at any particular time.

The motor 14 is driven by a driver amplifier 20. The purpose of the driver amplifier is to convert a digital input command on bus 22 to a suitable motor drive voltage or current on line 24 coupled to the motor 14.

The digital input command on bus 22 is generated by a software process 24 running on a computer 26. The software process 24 is comprised of at least two sub-processes each with a different function. A first routine 28 called "doforcewheel" calculates and outputs the digital command on bus 22 from three digital input values shown symbolically as signals on buses 30, 32 and 34. The data on these three buses comes from a model software process 36 which does not form part of the teachings of the invention. The purpose of the model process 36 is to evaluate data from sensors coupled to various controls manipulated by the vehicle operator to control the movements of the simulated vehicle and to calculate therefrom certain output data including the data on "buses" 30, 32 and 34. These buses do not actually exist in the preferred embodiment. Instead, the data on the "buses" 30, 32 and 34 is transferred between the model software process 36 and the doforcewheel process 28 by virtue of overlapping memory mapping. In other words, the model process 36 calculates the data on buses 30, 32 and 34 and writes the current value of these variables to storage locations in a memory map said location dedicated to these individual variables. When the doforcewheel software process 28 needs the data on buses 30, 32 and 34, it simply reads the contents of memory (not shown) at the locations assigned to these variables.

The data on buses 30, 32 and 34 represents the real world forces which are to be simulated. The "force" data on bus 30 represents the amount of force exerted on the steering wheel by the wheels of the car during turns and when hitting rocks and obstructions off road. The "damping" data on bus 32 represents the resistance to turning of the wheel which is felt when a real steering wheel is turned and increases with increasing speed of angular velocity of the steering wheel. The "friction" data on bus 34 represents the resistance to turning of the steering wheel on a motionless car resulting from scrubbing the tires on the pavement.

Another software process 38 called "wheelpos" accepts the steering wheel position data on bus 18 and calculates from it the average steering wheel position in the middle of each sampling interval and the steering wheel angular velocity. These two items of data are transferred to the model process 36 on "buses" 40 and 42 as the wheel position and wheel velocity data, respectively. There this data is used to determine the response the driver is having to a changing road scene displayed to him in terms of how hard and fast he or she is turning the car. This data is used in the calculations done by the model process to compute the data regarding "force", "damping" and "friction."

There is one other input to the software process 28. This input comes from a game software process 40 which implements the rules of the driving game. The game process sometimes requires the steering wheel to be centered such as at the start of the game. In some embodiments, the game process may also exhibit certain scenes on a video display (not shown) and exhibit typical responses of the simulated car to these scenes in what is called an attract mode. In this mode, it is desirable to be able to move the steering wheel to track the movements of the simulated car even though no player is actually playing the game. These unassisted movements are caused by the game process by virtue of sending the data on bus 42 to the software process 28.

Figure 2:
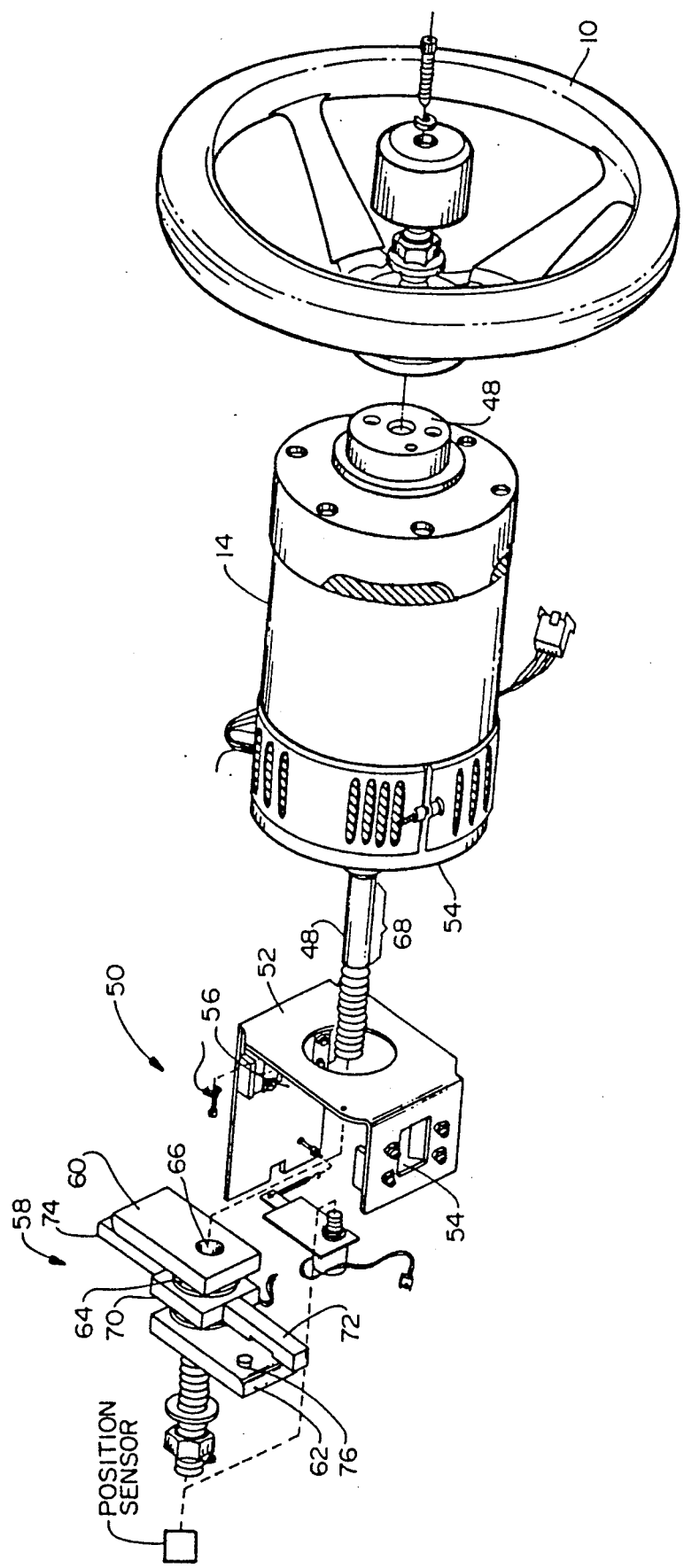
FIG. 2 is an exploded view of the mechanical configuration of a steering wheel, motor and emergency stop mechanism according to the teachings of the invention.

Referring to FIG. 2, there is shown in more detail the mechanical linkage between the motor 14 and the steering wheel 10. In the embodiment shown in FIG. 2, the steering wheel 10 is directly coupled to the motor shaft 48. Also coupled to the motor shaft is a safety locking mechanism shown generally at 50.

The purpose of the safety locking mechanism is to prevent the steering wheel 10 from turning more than a predetermined number of turns either clockwise or counterclockwise. In some embodiments this may be omitted. It is preferred, however, to prevent the motor 14 from ever causing the steering wheel to turn enough turns to accelerate to the full speed of the motor where the steering wheel could injure a child.

The safety locking mechanism is comprised of a frame 52 which bolts to the end surface 54 of the motor. The motor itself is fastened to the frame of the game (not shown). Thus the frame 52 does not move. In the frame 52, there are two apertures 54 and 56 on opposite sides (the aperture 56 is obscured). A rotating assembly 58, comprised of several individual pieces, is mounted on the motor shaft 48. The rotating assembly is comprised of two arms 60 and 62 joined rigidly by a threaded collar 64. Each arm and the threaded collar have a cylindrical hole 66 formed therein which has a diameter slightly larger than the diameter of a smooth portion 68 of the motor shaft 48. The outer surface of the collar 64 is threaded. The two arms 60 and 62 and the collar 64 are mounted on the motor shaft 48 such that the smooth portion 68 lies within the rotating assembly 58. The arm 60 has a key slot (not shown) in the circumference of the hole 66 which mates with a key (not shown) mounted in a key slot (not shown) in the motor shaft 48. Thus, the arms 60 and 62 and the threaded collar 64 rotate with the motor shaft 48.

There is threaded onto the threads of the collar 64 a coupler 70 which moves back and forth along the threads of the collar 64 as the collar and arms rotate. The direction of movement of the coupler 70 depends upon the direction of rotation of the motor shaft 48. Two dogs 72 and 74 are rigidly attached to the coupler 70 and extend through the apertures 54 and 56 in the stationary frame 52. The apertures 54 and 56 prevent rotation of the dogs 72 and 74 and thereby prevent rotation of the coupler 70. This causes the linear motion of the coupler along the centerline of the shaft 48 as the arms 60 and 62 rotate. Each of arms 60 and 62 has extending from the inside surface thereof a pin such as the pin 76. As the coupler 70 and the dogs 72 and 74 move, the linear motion of the coupler 70 along the centerline of the motor shaft 48 eventually brings one or the other of the dogs in contact with one or the other of the pins thereby preventing further motion of the arms 60 and 62. The threads on the collar 64 are of such a pitch that three complete revolutions of the motor shaft 48 will move the dogs 72 and 74 from stop to stop.

Figure 3:
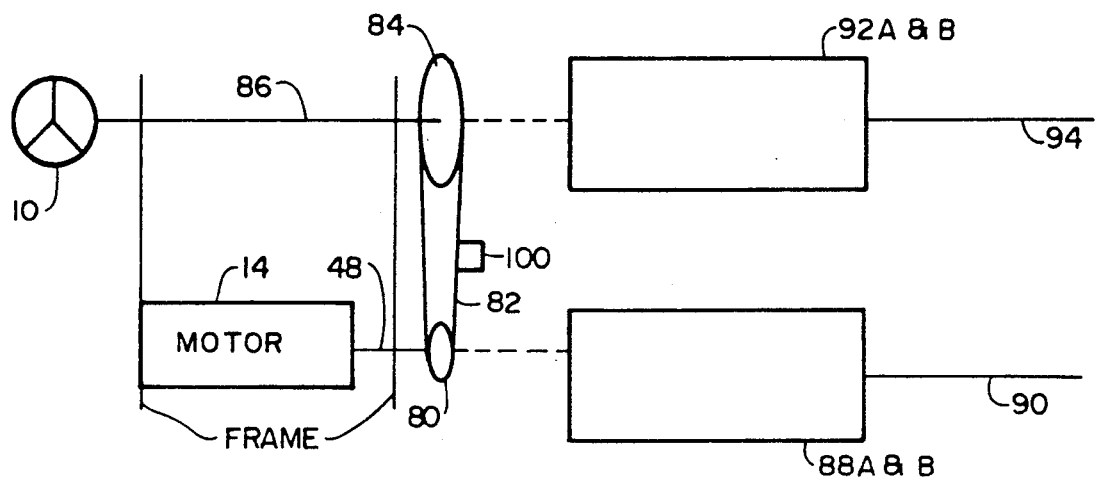
FIG. 3 is a block diagram of an alternative embodiment of a steering wheel and motor drive configuration without safety stops.

Referring to FIG. 3, there is shown an alternative embodiment for the mechanical coupling of the steering wheel 10 to the motor 14. In this embodiment, motor 14 has its shaft 48 coupled to a drive pulley 80. The drive pulley is coupled by a drive belt 82 to a speed reduction pulley 84 having a diameter larger than the diameter of the drive pulley 80. The speed reduction pulley 84 is coupled to the steering wheel 10 by a drive shaft 86. The ratio of diameters of the two pulleys should be such that even when the motor 14 is turning at full speed, the steering wheel 10 turns at a speed which is safe even for young players.

There is no mechanical stop mechanism in the embodiment of FIG. 3.

The drive pulley 80 is coupled to an optical shaft encoder 88A and 88B which provides output data on bus 90 regarding the position of the shaft 48. In the preferred embodiment, the optical shaft encoder 88 is a disk with a larger number of holes along the circumference. A light beam and detector along with supporting quadrature shaft encoding electronics of known design are used to detect the shaft position by shining the light beam through the holes in the disk.

The speed reduction pulley 84 is coupled to an index reading transducer 92A and B which provides output data on bus 94 when the steering wheel 10 passes an index point. This index reading transducer is typically comprised of a disk with a single hole in its circumference at the index point. A light beam and photodetector and suitable known electronics are used to detect when the steering wheel passes the index point.

A mechanical one-way belt tensioner 100 tightens the drive belt 82 to a desired level by tension. The tensioner acts on one side only of the drive belt despite the fact that the drive belt 82 turns in both directions. The tensioner is a form of mechanical diode. Several embodiments for the tensioner will be described below.

Figure 4:
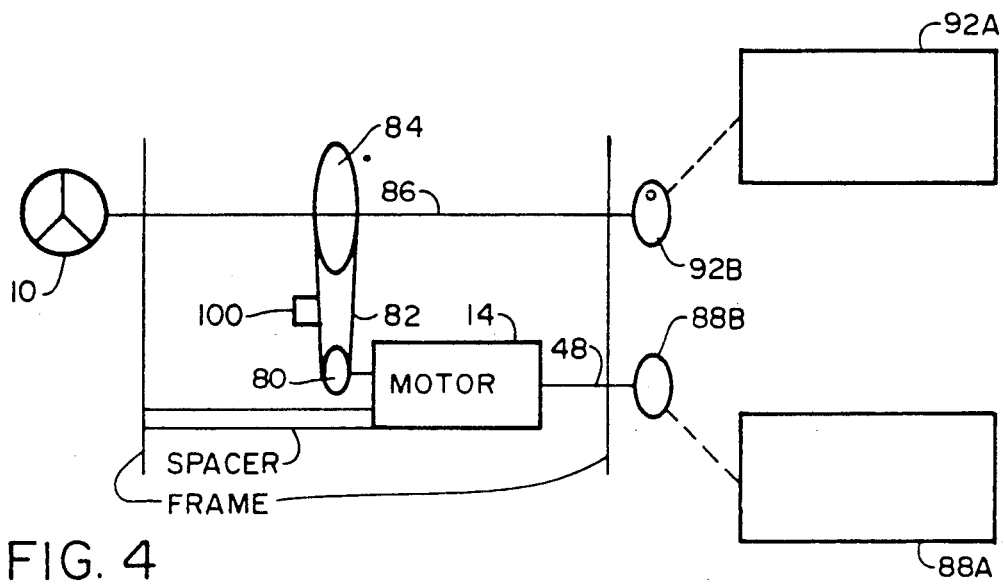
FIG. 4 is a block diagram of another alternative embodiment of a steering wheel and motor drive configuration without safety stops.

Referring to FIG. 4, there is shown another alternative embodiment for the mechanical coupling of the motor 14 to the steering wheel 10. In this embodiment, the drive pulley 80 and the speed reduction pulley 84 are on the opposite side of the motor 14 as the index reading transducer electronics 92A and index disk 92B and the optical shaft encoder electronics 88A/shaft encoder disk 88B. This prevents rubber crumbs and dust resulting from belt wear from interfering with the optical transducer circuits and eventually causing failure. As in the case of the embodiment of FIG. 3, the speed reduction pulley 84 drives a shaft 86 which drives both the steering wheel 10 and the index disk 92B. Likewise, the motor 14 drives a shaft 48 which drives both the drive pulley 80 and the shaft encoder disk 88B.

Figure 5:
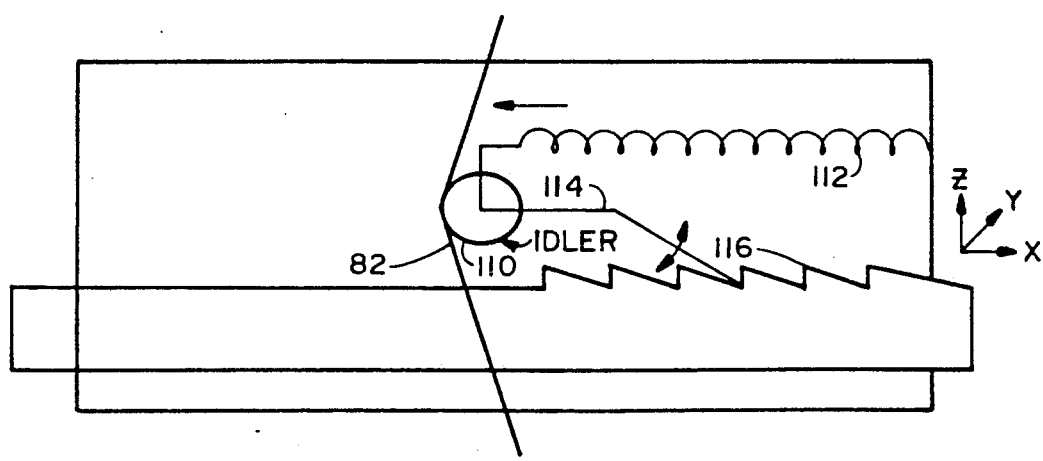
FIG. 5 is a diagram of one type of mechanical diode for use in controlling belt tension in the embodiments of FIGS. 3 and 4.

Referring to FIG. 5, there is shown one embodiment for a one-way belt tensioner. In FIG. 5, an idler pulley 110 is pushed against the drive belt 82 by the force of a compressed spring 112. The idler pulley 110 can be mechanically supported by any means allowing linear motion toward the drive belt such as support rails (not shown) or guide rods and linear bearings (not shown). The idler pulley 110 is coupled to an elastic latch 114 which is biased in the negative Z direction by spring force (its own) toward a ratchet 116. The ratchet has teeth which are configured to engage the latch 114 such that movement of the idler pulley 110 in the positive X direction is prevented except to the extent necessary to engage the latch 114 in the valley between 2 teeth. Thus, the idler pulley 110 moves under the influence of the spring 112 in one direction only along the negative X axis.

Figure 6:
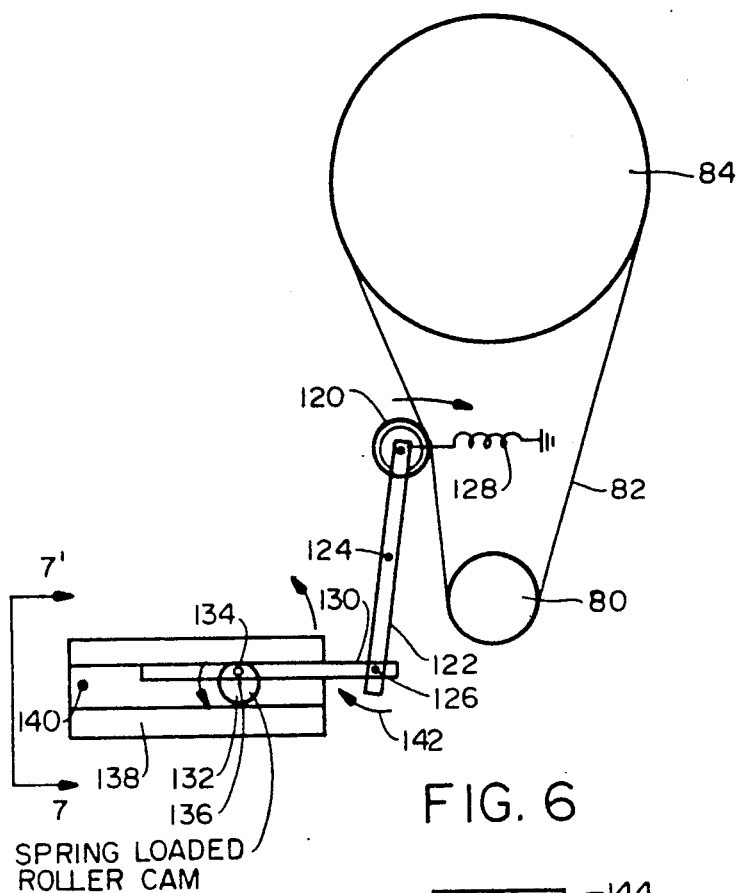
FIG. 6 is a diagram of another embodiment of a mechanical diode for use in controlling belt tension in the embodiments of FIGS. 3 and 4.

Referring to FIG. 6, there is shown another embodiment of a one-way belt tensioner. In this tensioner, an idler pulley is rotationally coupled to the end of a lever arm 122 which is coupled to a frame (not shown) at pivot pin 124. The idler wheel is biased toward the drive belt 82 by a spring 128 which is anchored to the frame (not shown). The lever arm 122 is pivotally coupled to another lever arm 130 by pivot pin 126. This lever arm 130 is pivotally coupled to a spring biased rotating cam 132 at a pivot point 134. The cam 132 is spring biased by a spring (not shown) to tend to rotate in the clockwise direction. The cam 132 is pivotally connected by pin 136 to a U-shaped channel 138.

Figure 7:
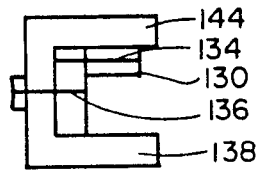
FIG. 7 is a cross sectional view of the channel in the embodiment of FIG. 6.

The relationship between the U-shaped channel 138, the cam 132 and the lever arm 130 is best shown in FIG. 7, which is an end view of the channel 138 taken from the vantage point shown by view line marked 7—7' in FIG. 6. The U-shaped channel 138 is pivotally connected to the frame (not shown) by a pivot pin 140.

In operation, the spring 128 biases the idler 120 toward the belt 82 which causes the lever arm 122 to trace the arc 142 at pivot point 126. This causes lever arm 130 to move left and the pivot point 126 to move left and up. This causes the cam 132 to rotate counterclockwise and the U-shaped channel 138 to rotate about pivot point 140 in a counterclockwise direction to remain parallel to lever arm 130 and to maintain the gap between lever arm 130 and the U-shaped channel upper arm 144 at or near zero. This substantially zero gap prevents movement of the idler 120 away from the belt 82.

Figure 8:
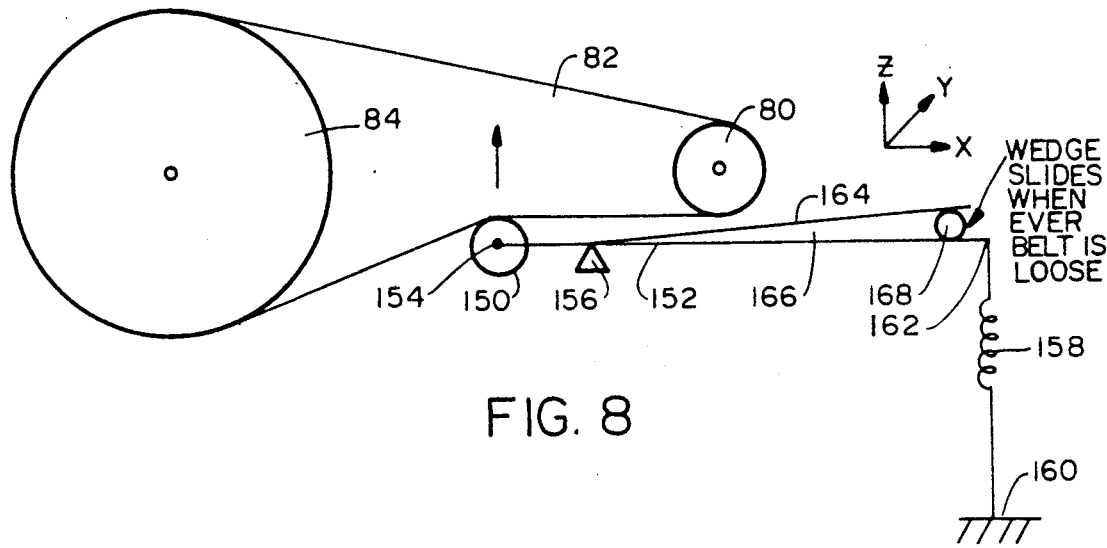
FIG. 8 is a diagram of another mechanical diode used in controlling belt tension in the embodiments of FIGS. 3 and 4.

Referring to FIG. 8, there is shown another alternative embodiment for a belt tensioner. In this embodiment, idler pulley 150 is pivotally coupled to lever arm 152 at pivot 154. Lever arm 152 is pivotally attached to the frame (not shown) at pivot point 156. A spring 158 is attached to the frame 160 and the lever arm 152 at point 162 and biases the idler pulley 150 toward the belt 82. A fixed guide member 164 is rigidly attached to the frame so as to form a wedge-shaped space between the guide member 164 and lever arm 152. A wedge 168 slides in the space 166 under the influence of a spring (not shown) so as to bias the wedge 168 to move in the negative X direction. Whenever the belt 82 becomes loose, the spring 158 forces the idler pulley 150 against the belt 82, thereby increasing the angle between the lever arm 152 and the guide 164. When this angle increases, the wedge 168 moves further in the negative X direction, thereby preventing the angle from ever decreasing again. Thus, the idler pulley 150 can only move in the positive Z direction against the belt to tighten it and will never allow the belt to loosen.

Figure 9:
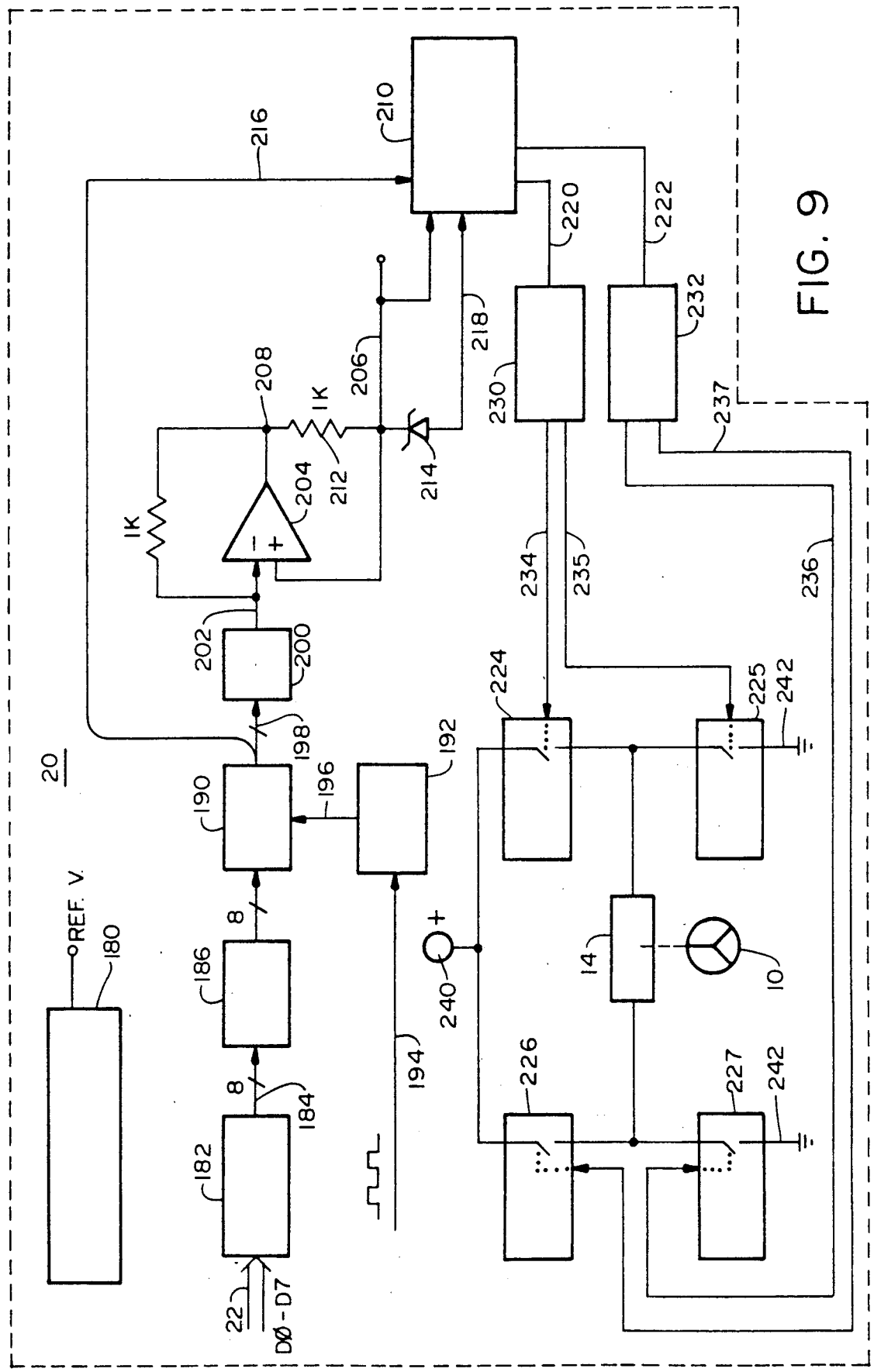
FIG. 9 is a block diagram of a motor driver amplifier according to the teachings of the invention.

Referring to FIG. 9, there is shown a block diagram of the driver amplifier 20 in FIG. 1. The driver amplifier receives data on bus 22 from the software driver for the steering wheel indicating how much force is to be applied to the steering wheel. This data is converted by the circuitry shown in FIG. 9 to signals suitable to drive the motor 14 such that the desired amount of force is applied to the steering wheel 10. The amplifier 20 utilizes a power conditioner and radio frequency interference suppression circuit 180 to suppress power supply generated noise which could interfere with surrounding video circuitry.

The incoming desired force data is buffered in buffer 182 so that the bus 22 may be freed to convey data to other circuits not comprising part of the invention. From the buffer, the data is passed via bus 184 through optical isolator 186 to provide protection for the circuitry from surges on the buses 22 and 184. The data is then latched in a latch 190.

A capacitive energy storage circuit 192 teams with the latch 190 to reduce the force applied to the steering wheel 10 upon failure of the software driver. This is done by storing energy arriving in the form of clock pulses on bus 194. This clock signal on bus 194 is generated by the software driver 28 in FIG. 1 such that if a software "crash" occurs, the clock pulses will no longer be present on bus 194. As long as the clock pulses are arriving on bus 194, the capacitive energy store 192 stores sufficient energy from the clock pulses to maintain a line 196 coupled to the clear input of the CMOS latch 190 at a logic 1 level. The clear input is active low and will cause the output bus 198 to be driven to all logic 0's when the clear input is driven low. If there is a software "crash", i.e., the software driver 28 in FIG. 1 is no longer supplying valid data on bus 22, the clock pulses on bus 194 will stop arriving. In this event, an energy leakage path in capacitive energy store 192 will leak sufficient energy from a capacitor coupled to line 196 to cause the voltage on line 196 to drop to a logic 0 level thereby clearing the latch 190 and causing the force level to drop to 0.

The force data on bus 198 is coupled to the input of a digital-to-analog converter 200 which converts the data to an analog voltage on line 202. This voltage is applied to one input of an operational amplifier 204 which amplifies the difference between the voltage on line 202 and a reference voltage applied to line 206 from the power conditioner 180. The output voltage at node 208 is applied to the input of a duty cycle pulse width modulator 210 through a resistor 212 and a zener diode 214. The duty cycle pulse width modulator 210 also receives the reference voltage on line 206 and a direction control signal on line 216. The direction control signal is one bit of the data output of latch 190.

The duty cycle pulse width modulator 210 converts the force signal on line 218 and the direction signal on line 216 to a series of motor drive pulses on either the "drive even" output line 220 or the "drive odd" output line 222. The width of the pulses reflects the desired amount of force, and the direction signal on line 16 determines whether the pulses appear on line 220 or line 222.

The output lines 220 and 222 are coupled to motor control switches 224, 225, 226 and 227 through delay interlock circuits 230 and 232 and lines 234, 235, 236 and 237. The duty cycle controller 210 drives the output lines 220 and 222 such that when the motor 214 is to be driven in one direction, switches 226 and 225 will be closed and switches 224 and 227 will be open. Switches 226 and 225 will be closed typically with the duty cycle defined by the duty cycle controller 210 for the then existing force signal on line 218 so as to regulate the amount of torque generated by the motor 214. When the motor is to be driven in the opposite direction, switches 224 and 227 will be closed with the appropriate duty cycle and switches 226 and 225 will be opened. The switches 224 and 226 are P channel FET's, and the switches 227 and 225 are N channel FET's. The delay interlocks 230 and 232 convert the signals on output lines 220 and 222 to the appropriate voltages to operate the FET switches 224 through 227 via the lines 234 through 237 coupled to their gate nodes and impose safety delays. These safety delays insure that switches 224 and 225 are never simultaneously closed and that switches 226 and 227 are never simultaneously closed. The switches 224 through 227 guide the power from the positive "rail" 240 through the motor to ground 242 in the appropriate direction to cause the motor 14 to attempt to turn or turn the steering wheel 10 in the appropriate direction.

Referring to FIGS. 10A and 10B, there is shown a high level language description in the "C" programming language of the wheelpos software driver routine. Although the C programming language is used in the preferred embodiment, it is not critical to the invention, and any programming language or digital logic which implements the functions and mathematics described in FIGS. 10A and 10B will suffice for purposes of practicing the invention. The purpose of the software driver routine shown in FIGS. 10A and 10B is to read the wheel position data from the wheel position sensors on line 18 in FIG. 1 and calculate and output the steering wheel position and velocity for use by the model process 36.

The code at line 12 of FIG. 10A serves to normalize the wheel position data to establish the wheel position relative to a wheel center position. The variable "wheelcenter" is calculated once in a subroutine (not shown) which causes the motor 14 to move the steering wheel to each stop and read the steering wheel position sensors at each stop and then calculate the "wheelcenter" value as the midpoint between these two readings. This is done once at powerup time.

In the preferred embodiment, two analog-to-digital converters are coupled to the position sensor for safety purposes to insure that the steering wheel position can always be sensed in case of failure of one of the analog-to-digital converters. One of the analog-to-digital converters is an 8 bit converter and the other is a 12 bit converter. The code at line 12 uses the 12 bit position data and subtracts from it the "wheelcenter" value.

The code at line 13 scales the wheel position data to obtain a value between plus and minus 2047.

The code at line 14 calculates a raw steering wheel velocity based upon the change in steering wheel position since the last time the wheelpos routine of FIGS. 10A and 10B was performed (it is performed periodically). The code at line 14 also performs the digital equivalent of low pass filtering. The output value of this calculation is the variable "rawswvel" and is output to the model process 36 as the data on bus 42 in FIG. 1.

The code at lines 18 through 28 implements the digital equivalent of putting "play" or mechanical slippage in the steering wheel linkage of a real car. The physical model implemented is shown in FIG. 11. The actual steering wheel position is represented by the position of block 280. The position of the steered wheels is represented by the position of the block 282. The distance between the edges of the blocks 280 and 282 is the play that is digitally modeled by the code. The model of FIG. 11 is intended to show how the steering wheel block 280 may move the steered wheels block 282 after the distance between blocks 280 and 282 has been moved and block 280 meets block 282. Likewise, the steered wheels can move the steering wheels when block 282 moves through the play distance. In the code of lines 18 through 28, the key values used are : "play", a constant; "playpos", the actual position of the block 282; and "diff", the actual distance between blocks 280 and 282. The code at lines 25 through 28 moves the block 282 based upon the amount of force on block 180 if the value of the constant "play" is less than the value of the variable "diff".

The code at line 29 calculates the steering wheel velocity with a different frequency response and a different scaling factor for low pass filtering purposes to smooth the response of the system. Finally, the code at line 34 returns the new value for "playpos" or the position of the steered wheels to the model process 36 in FIG. 1.

Referring to FIGS. 12A and 12B, there is shown the high level language of the software driver process 28 that calculates the desired force data on bus 22 in FIG. 1. The code of FIGS. 12A and 12B is expressed in the C programming language, but this is not critical to the invention, and any programming language or digital logic which implements the logic and mathematics expressed in FIG. 12A and 12B will suffice for purposes of practicing the invention.

The code at line 13 in FIG. 12A calculates the average steering wheel position over the 4 millisecond interval between times when the doforcewheel routine (a timed interrupt service routine) of FIGS. 12A and 12B is performed. This calculation is performed by adding the quantity steering wheel velocity times the 4 millisecond interval divided by 2 to the steering wheel position at the start of the interval.

A safety mechanism is implemented by the code of line 14. This mechanism sets the steering wheel torque to 0 if an interrupt counter counting the times the doforcewheel service routine has been done between updates of the data from the model process 36 in FIG. 1. Thus, if the model process has "crashed" in that it is no longer updating the data on "buses" 30, 32 and 34, the doforcewheel process 28 in FIG. 1 sets a steering wheel torque variable to 0 to control the data on bus 22 in FIG. 1 such that the steering wheel 10 cannot be driven by the motor 14.

The model process 36 in FIG. 1 normally updates the data on buses 30, 32 and 34 every 25 milliseconds. This can cause a "grainy" or discontinuous feel in the force on the steering wheel 10 applied to it by the steered wheels' interaction with the road. To get rid of this "grainy" feel, a low pass filtering step is implemented by the code of line 15.

The code of line 16 scales the input torque or force data on bus 30 in FIG. 1 from a maximum of 4096 to a maximum of 512 by a right shift of 3 places.

Next the torque or force data on bus 30 from the model process 36 is clipped to be within a certain safety range by the code of lines 18 and 19 in FIG. 12A.

In order to calculate how much to move the steering wheel and the steered wheels based upon the amount of force applied to the steering system, it is necessary to calculate the friction force acting on the steering system resulting from scrubbing of the wheels and the torque acting on the steering wheel resulting from that friction and tending to resist movement of the steering wheel. This calculation is based upon the model shown in FIG. 13. In this model, a spring 300 is attached between a block 302 resting on a surface 304 and a node 306 to which force is applied. The force stretches the spring 300 and the spring 300 applies a certain force to the block 302. The force that the spring applies to the block 302 depends upon the amount of stretch in the spring and the spring constant. The block 302 will move when the force on node 306 stretches the spring far enough that the force applied by the spring to the block 302 exceeds the friction force between the block 302 and the surface 304 tending to resist movement of the block. The friction force tending to resist movement of the block 302 is the friction data on bus 34 from the model process 36 in FIG. 1. As in a real car, as the driver turns the steering wheel, the steering wheel and steered wheel movement is resisted by the friction of scrubbing tires across the pavement and by the elasticity of the rubber in the tires. When the force exerted by the steering wheel on the tires is sufficient to overcome the friction, the steered wheels will move and the spring will "unstretch" until the force resulting from the spring constant and the stretched spring drops to or below the friction force tending to resist movement. The code of line 21 calculates the torque acting on the steering wheel based upon how much the spring is stretched (adjswpos-swfrblk) and the spring constant (swfrk) and a scaling factor (10×10).

After calculating the steering wheel torque attributable to the friction, the code of lines 22 through 24 of FIG. 12A is used to decide whether block 302 should be moved given the current stretch status of the spring 300. That is, the torque acting on the steering wheel from the friction is compared to the friction force acting on the block 302. If the torque acting on the steering wheel is greater than the friction resisting movement, the block 302 is moved to a position such that the stretched status of the spring 300 at that position creates a force acting on the block 302 which is equal to the friction force tending to resist movement of the block 302 as represented by the code at line 24. The code at line 23 is executed if the friction torque acting on the steering wheel is greater than the friction force resisting movement of the block 302, and sets the friction torque acting on the steering wheel equal to the force tending to resist movement of the block 302 attributable to friction. The code of lines 23 and 24 is executed if the condition of line 22 is true. However, if the condition of code line 22 is not true, then the test of code line 25 is performed wherein the friction torque acting on the steering wheel is tested against the negative of the force resulting from friction acting on the block 302. Code lines 26 and 27 are the analogous operations to code lines 23 and 24 for movement in the opposite direction.

The code at lines 29 and 30 in FIG. 12A compares the present steering wheel position to the desired steering wheel position as determined by the data on "bus" 42 from the game process 40 in FIG. 1. If the steering wheel is not in the desired position, then a servotorque is calculated which moves the steering wheel to the correct position.

The code at lines 44 through 49 implements another safety feature to insure that the steering wheel is not moving too fast for safety. This code checks the steering wheel position every eight interrupts to determine if the steering wheel position has changed more than a predetermined amount. If it has, it is assumed that the steering wheel is moving too fast, and the value of a variable "forceoff" is set to zero. This value is later used to shut off the driving voltage for the driver amplifier 20 in FIG. 1 such that torque to the steering wheel 10 is shut off.

The code at lines 54-56 implements another safety feature. This code checks the position of the steering wheel as indicated by the output of the 8 bit analog-to-digital converter as compared to the position of the steering wheel as indicated by the output of the 12 bit analog-to-digital converter. If the two positional indications do not match, there is some problem with the system, and the value of the variable "forceoff" is set to a level which will insure that the levels of torque applied to the steering wheel are not dangerously high.

Another safety check is implemented by the code of lines 59 and 60. This code checks the steering wheel velocity calculation based on the output of the 12 bit analog-to-digital converter as performed in the wheel position software routine illustrated in FIGS. 10A and 10B against certain safety limits. If the steering wheel velocity is outside the safety limits, or if the value of the variable "forceoff" is such that the "forceoff" flag is set, then the steering wheel force is set to zero to insure that no injury occurs.

The code at lines 61 through line 63 sets an eddy current force to a low value so that the steering wheel does not spin freely if manually spun in the direction for which there is no natural eddy current drag. That is, the circuitry of the driver amplifier is such that there is no natural eddy current drag of the motor when the motor is turned in one direction, while there is a natural eddy current drag when the motor is turned in the opposite direction. The code of lines 61 through 63 sets this eddy current drag artificially so that the natural eddy current drag in one direction is matched by an artificial eddy current drag in the other direction. This gives the steering wheel a more natural feel.

Finally, the code of lines 67 and 68 sets the steering wheel force data which is output on bus 22 of FIG. 1 in the normal operation mode when none of the foregoing safety conditions is true. The steering wheel force is calculated as the sum of the steering wheel torque calculated from the model inputs plus the calculated torque resulting from friction plus the servotorque calculated from the game input data on "bus" 42 in FIG. 1 plus the damping torque. The damping torque is calculated based on the steering wheel velocity times the steering wheel damping coefficient times a scaling factor.

Referring to FIG. 14, there is shown the software routine which takes the force number calculated in the software routine of FIGS. 12A and 12B and outputs it on the bus 22 in FIGS. 1 to the driver amplifier 20. Prior to outputting the force number, the force number is clipped to be within safety limits defined by the constant "SWFMAX" and "-SWFMAX". Next, in the preferred embodiment, the force number is scaled according to the seat position established by the operator. In the preferred embodiment of the arcade game, a slidable seat is used for the driver. The driver sets the seat position for the most comfortable operation of the simulated controls. The seat position is sensed by a sensor (not shown) which generates data represented by the data on "bus" 23 in FIG. 1. For purposes of illustration, the routine of FIG. 13 is symbolically part of the software driver routine 28 in FIG. 1. Because smaller drivers will set the seat closer to the simulated controls, the steering wheel force is scaled to a lower value if the seat position indicates that a smaller driver is operating the game. The code of FIG. 13 also allows the arcade operator to scale the force applied to the steering wheel by an independent input (not shown in the drawings). Finally, the software routine of FIG. 14 outputs the clipped and scaled force number as the data on bus 22 in FIG. 1.

Referring to FIGS. 15A and 15B, there is shown a high level language description of the initialization code which establishes the values of the variables "wheelcenter" and "wheelscale". These two variables are used in the routine "wheelpos" symbolized by block 38 in FIG. 1. The software of FIG. 15A and 15B also sets up limits for the software driver routines.

Referring to FIG. 16, there is shown the high level language description of a routine called "do-seat". This routine reduces the force variable in accordance with the seat position and unlocks the seat if the operator moves the seat farther back than a predetermined amount.

Although the invention has been described in terms of the preferred and alternative embodiments described herein, those skilled in the art will appreciate that many variations may be made. All such variations not departing from the true spirit and scope of the teachings herein are intended to be included within the claims appended hereto.

What is claimed is:

1. An apparatus in a simulated vehicle for simulating in the steering wheel of said simulated vehicle the forces felt in a steering device of a real vehicle comprising:

a rotatable steering wheel for a simulated vehicle for being manipulated by an operator of said simulated vehicle;

an electric motor means coupled to said steering wheel for driving said steering wheel with an amount of torque controlled by an input signal;

travel limitation safety means coupled to said motor means for limiting the number of revolutions of said steering wheel to a predetermined maximum number such that if said steering wheel is allowed to rotate freely under the influence of said motor means, insufficient turns available for said steering wheel to attain an unsafe RPM that could injure a user;

an amplifier means for driving said electric motor in accordance with a driving signal indicative of the amount of torque to apply to said steering wheel;

sensor means coupled to said steering wheel for sensing the instantaneous position of said steering wheel; and computer means coupled to said amplifier means and said sensor means for calculating the position and velocity of movement of said steering wheel and for outputting said data, and for receiving model data regarding the forces which would be acting upon said steering wheel if said steering wheel was being used for steering a real vehicle and for calculating from said model data drive signal data necessary to define said driving signal and for generating said driving signal from said driving signal data and outputting said driving signal to cause said amplifier means to drive said motor means such that forces are felt by an operator manipulating said steering wheel which simulate the actual forces which would be felt in an actual steering wheel under similar conditions acting upon said real vehicle.

2. The apparatus of claim 1 wherein said computer means includes means for receiving and using at least a selected portion of said model data defining the force which is acting on said steering wheel originating from simulated roadway conditions acting upon the steered portion such as, for example, the steered wheels of said simulated vehicle.

3. The apparatus of claim 2 wherein said computer means includes means for receiving and using at least a selected portion of said model data defining the damping force acting on said steering wheel which simulate the damping force which resists motion of a real steering wheel in said real vehicle and which is proportional to the velocity with which said steering wheel is being moved.

4. The apparatus of claim 3 wherein said computer means includes means for receiving and using a selected portion of said model data defining the friction force which resists motion of a real steering wheel resulting from friction of various elements in the steering mechanism of said real vehicle.

5. The apparatus of claim 4 wherein said simulated vehicle is a car and wherein said data representing friction simulates the friction of scrubbing said steered wheels of a real car over real pavement when said steering wheel is turned.

6. An apparatus in a simulated vehicle for simulating the feel of a steering device in a real vehicle, comprising:
   a steering device for the simulated vehicle;
   means for electrically driving said steering device to apply forces to it in accordance with an input signal;
   calculation means coupled to said steering device and said means for electrically driving, for calculating the position and velocity of movement of said steering device in response to simulated conditions displayed to an operator of said simulated vehicle and for outputting said position and velocity data, and for receiving input data regarding the forces which would be acting on a real steering device under similar circumstances in the real world, and for generating from said input data an output signal, and for transmitting said output signal to said means for electrically driving so as to cause said means for electrically driving said steering device to generate forces in said steering device which simulate the forces which would be felt in a real steering device in said real vehicle under similar conditions and further comprising safety means in said calculation means for preventing said means for electrically driving from applying forces outside a safe range to said steering device.

7. The apparatus of claim 6 wherein said means for electrically driving is an electrical motor.

8. The apparatus of claim 7 wherein said calculation means includes means to calculate and generate said output signal so as to simulate an environment feedback force which would be felt in said steering device originating from forces from the environment acting upon the steered portion of a real vehicle from a portion of said input data which defines the level of said environment feedback force under then existing simulated conditions.

9. The apparatus of claim 8 wherein said calculation means includes means to calculate and generate said output signal so as to simulate the friction force which would be felt in said steering device originating from friction forces acting upon the steered device in a real vehicle and for adding these forces to environment feedback forces acting upon the steering device.

10. The apparatus of claim 9 wherein said calculation means includes means to calculate and generate said output signal so as to simulate the damping force which would be felt in said steering device in a real vehicle resulting from damping action of the steering mechanism of a real vehicle tending to resist movement of the steering device in proportion to the velocity of movement of said steering device, and for adding this forced to said friction force and said environment feedback force, and further comprising means coupled to said means for electrically driving to limit the range of motion of said steering device such that, if unrestrained, said steering device will not build up an unsafe speed under the influence of said means for electrically driving.

11. An apparatus for simulating the forces felt in a steering device of a real vehicle comprising:
   a rotatable steering wheel for a simulated vehicle for being manipulated by an operator of said simulated vehicle;
   an electric motor means coupled to said steering wheel for driving said steering wheel with an amount of torque controlled by an input signal;
   travel limitation safety means coupled to said motor means for limiting the number of revolutions of said steering wheel to a predetermined number such that if said steering wheel is allowed to rotate freely under the influence of said motor means, insufficient turns are available to build up a high RPM for said steering wheel;
   an amplifier means for driving said electric motor in accordance with a driving signal indicative of amount of torque to apply to said steering wheel;
   sensor means coupled to said steering wheel for sensing the instantaneous position of said steering wheel; and
   computer means coupled to said amplifier means and said sensor means for calculating the position and velocity of movement of said steering wheel and for outputting said data, and for receiving model data regarding the forces which would be acting upon said steering wheel if said steering wheel was being used for steering a real vehicle and for calculating from said model data drive signal data necessary to define said driving signal and for generating said driving signal from said driving signal data and outputting said driving signal to cause said amplifier means to drive said motor means such that forces are felt by an operator manipulating said steering wheel which simulate the actual forces which would be felt in an actual steering wheel under similar conditions;
   means in said computer means for simulating the mechanical play felt in real steering wheels and for generating said driving signal in such a manner that no resistance to movement of said steering wheel is felt by an operator until said steering wheel has been moved a predetermined distance.

12. The apparatus of claim 11 further comprising means in said amplifier means for determining if said driving signal is valid, and, if not, for causing the torque generated by said motor means to be substantially reduced.

13. The apparatus of claim 11 further comprising means in said computer means for determining if valid model data is being received and, if not, for generating drive signal data which will cause the torque generated by said motor means to be substantially reduced.

14. The apparatus of claim 11 further comprising means in said computer means for comparing said drive signal data to limits defining a safe range of torques that may be applied to said steering wheel and, if said drive signal data is outside said safe range, for altering said drive signal data to be within said safe range.

* * * * *